United States Patent
Lau

(10) Patent No.: US 7,197,335 B2
(45) Date of Patent: Mar. 27, 2007

(54) MULTI-ANTENNA ACCESS POINT ARCHITECTURE AND METHODS

(75) Inventor: Vincent Lau, Hong Kong (HK)

(73) Assignee: University of Hong Kong (CN)

( * ) Notice: Subject to any disclaimer, the term of this patent is extended or adjusted under 35 U.S.C. 154(b) by 366 days.

(21) Appl. No.: 10/805,378

(22) Filed: Mar. 22, 2004

(65) Prior Publication Data

US 2005/0208975 A1 Sep. 22, 2005

(51) Int. Cl.
*H04B 1/38* (2006.01)
*H04M 1/00* (2006.01)
*H04Q 7/00* (2006.01)
*H04L 12/28* (2006.01)

(52) U.S. Cl. .................. 455/561; 455/554.2; 455/558; 455/562.1; 455/556.2; 370/338; 370/401

(58) Field of Classification Search .. 455/556.1–556.2, 455/422.1, 62, 132, 550.1, 553.1, 554.2, 455/557–558, 561, 101–103, 11.1, 24–25, 455/65, 515, 41.2, 507, 562.1, 575.7; 370/285, 370/334, 338, 349, 352–356, 412–413, 428, 370/401; 375/267, 299, 347; 343/751, 835, 343/844, 853, 893; 706/13
See application file for complete search history.

(56) References Cited

U.S. PATENT DOCUMENTS

| 5,282,222 | A | 1/1994 | Fattouche et al. |
| 5,555,268 | A | 9/1996 | Fattouche et al. |
| 6,850,512 | B1* | 2/2005 | Bishop et al. ............... 370/342 |
| 6,940,823 | B1* | 9/2005 | Park et al. ................... 370/252 |
| 2003/0067890 | A1* | 4/2003 | Goel et al. ............... 370/310.1 |
| 2003/0076891 | A1* | 4/2003 | Won ........................... 375/267 |
| 2003/0185241 | A1* | 10/2003 | Lu et al. ...................... 370/476 |
| 2005/0130664 | A1* | 6/2005 | Sang et al. .................. 455/450 |
| 2005/0135416 | A1* | 6/2005 | Ketchum et al. ........... 370/469 |
| 2005/0193309 | A1* | 9/2005 | Grilli et al. ................. 714/752 |
| 2006/0146874 | A1* | 7/2006 | Yuan et al. .................. 370/468 |

OTHER PUBLICATIONS

"OFDM Tutorial": Wave Report — Covering Next Generation Computing and Communications Technologies; http://www.wave-report.com/tutorials/ofdm.htm.
Telatar, I. Emre; "Capacity of Multi-antenna Gaussian Channels"; European Transactions on Telecommunications, vol. 10, No. 6; pp. 585-595, Nov.-Dec. 1999.
Whitepaper — Wide-band Orthogonal Frequency Division Multiplexing (W-OFDM); WiLAN-Wireless Data Communications; Sep. 2000.
Wideband Orthogonal Frequency Division Multiplexing (W-OFDM); WiLAN-Wireless Data Communications; Sep. 2000.
Zaghloul Hatim, et al.; "Reed Solomon FEC for OFDM Transceiver"; WiLAN-Wireless Data Communications; Nov. 11, 1998.

(Continued)

*Primary Examiner*—Meless Zewdu
(74) *Attorney, Agent, or Firm*—Dickstein, Shapiro, LLP.

(57) ABSTRACT

High capacity WLAN access point architecture is described layered above a MAC layer of a standard WLAN protocol stack. Methods for forming orthogonal beams to deliver downlink information to a plurality of mobile devices and for separating uplink packets from the mobile devices are disclosed. A near-optimal scheduling method for scheduling the transmission from each mobile device is also disclosed.

8 Claims, 10 Drawing Sheets

OTHER PUBLICATIONS

Knudsen, Knud, et al.; "Exploiting Pilot Subcarriers in OFDM Transceiver Systems to Augment Data Recovery"; WiLAN-Wireless Data Communications.

Winters, Jack H.; "Optimum Combining in Digital Mobile Radio with Cochannel Interference"; IEEE Journal on Selected Areas in Communications; vol. SAC-2, No. 4; Jul. 1984; pp. 528-539.

"Supplement to IEEE Standard for Information Technology – Telecommunications and Information exchange between systems – Local and metropolitan area networks – Specific requirements"; Part 11: Wireless LAN Medium Access Control (MAC) and Physical Layer (PHY) Specifications – High-speed Physical Layer in the 5 GHz Band; IEEE Std 802.11a-1999;.

* cited by examiner

MULTI-ANTENNA ACCESS POINT ARCHITECTURE AND METHODS

BACKGROUND OF THE INVENTION

1. Field of the Invention

The present invention relates to the field of wireless communication systems. More specifically, the invention relates to architectures and methods for high capacity WLAN access points with multiple antennas.

2. Description of the Related Art

Many mobile devices, such as cellular phones for example, are capable of operating in two modes. In one mode, the mobile device is capable of linking to a cellular network having a cell range on the order of kilometers thereby allowing the user of the mobile device to maintain communication while traveling in a car or train. In another mode, the mobile device is capable of linking to short-range wireless technologies, such as for example wireless local area networks (WLANs) or Bluetooth.

The growing use of these dual-mode mobile devices coupled with the perceived need for high data rate access to a network while in public places such as airports or coffee shops, for example, create bottlenecks at information hot-spots where a WLAN cell lacks the capacity to service all the access requests from the users within the WLAN cell.

To illustrate bottlenecks at the access point, a discussion of network communications protocols are necessary. Network communications may be modeled on a layered architecture known as a protocol stack. The layered structure allows separate development teams to work on different layers while maintaining interoperability among the various network hardware and software vendors. The Open Systems Interconnection (OSI) reference model separates network communications into seven distinct layers while the older TCP/IP protocol uses a four-layer stack. Both architectures have a top application layer that provides network services to applications requesting such services and both architectures have a bottom layer that handles the encoding of binary data, conversion of the binary data into physically measurable quantities such as voltages or light pulses, and transmission of the measurable quantities over a transmission medium such as air or cable.

Wireless local area networks (LANs) have at least a portion of the network that does not use cable as the transmission medium. The wireless LAN protocols are defined in OSI Layer 1 and OSI Layer 2. OSI Layer 1, also referred to hereinafter as the physical layer, defines the protocols for the encoding of binary data, conversion of the binary data into physically measurable quantities such as voltages or light pulses, and transmission of the measurable quantities through the air.

OSI Layer 2, also referred to hereinafter as the data link layer, defines the protocols for providing basic packet addressing services, checking transmitted packets for errors, and arbitrating access to the network.

Several standards exist for wireless LAN technologies such as IEEE 802.11, HiperLAN/2, and Bluetooth. For purposes of illustration, the mobile devices are assumed IEEE 802.11a compliant, however, it should be understood that the scope of the present invention is not limited to IEEE 802.11a compliant devices and may encompass devices based on other wireless LAN standards.

The IEEE 802.11a standard defines operations using orthogonal frequency division multiplexing (OFDM) modulation in the 5 GHz band. The standard supports a maximum data transfer rate of 54 Mbps. The maximum data transfer rate of 54 Mbps may become a bottleneck when many devices attempt to communicate with the same access point in a crowded café, for example.

FIG. 1 is a diagram of the physical and data link layers of the network protocol stack that indicates the scope of the IEEE 802.11a standard. As indicated in FIG. 1, the IEEE 802.11a standard, indicated by double-ended arrow 100, includes the physical layer 140 of OSI Layer 1 180 and part of the data link layer of OSI Layer 2 185. The data link layer 185 is divided into two sublayers; the medium access control (MAC) layer 145 and the logical link control (LLC) layer 147.

The LLC layer 147 is defined by a standard such as, for example, IEEE 802.2 standard and provides addressing and data link control that is independent of the topology, transmission medium, and medium access control protocols of the underlying layers.

The MAC layer 145 provides access control functions for the shared transmission medium. Access to the wireless medium in the IEEE 802.11a and HiperLAN2 standards are based on Carrier Sense Multiple Access with Collision Avoidance (CSMA/CA). The MAC layer 145 can operate in two modes: Distributed Coordination Function (DCF) and Point Coordination Function (PCF).

FIG. 2 is a timing diagram illustrating the communication exchange between two wireless devices using DCF. Under CSMA/CA, the mobile device (MD) or access point (AP) listens to a channel to determine if the channel is idle. If the channel is carrying a transmission, both the MD and AP continue listening to the channel. Once the channel becomes idle, the MD and AP waits a predetermined time referred to as Distributed coordination function Inter Frame Space (DIFS) 210. In order to avoid collisions with other devices, the transmitting device waits an additional backoff period 220. The backoff period is a randomly generated integer representing the number of timeslots the device will wait before attempting to transmit a packet on the channel. Backoff timer decrements the randomly generated integer until the channels becomes busy again or the time reaches zero. If the channel becomes busy during the backoff period, the device monitors the channel until it senses the channel is idle. Once the channel is idle, the device waits for one DIFS period before resuming the countdown on the backoff timer. When the backoff timer reaches zero and the channel is still idle, the device begins packet transmission 230. The receiving device receives the transmitted packet and checks the packet to determine if there were any transmission errors. If there are no transmission errors, the receiving device waits for one Short Inter Frame Space (SIFS) 235 before transmitting an acknowledgement (ACK) 240. The SIFS period is less than the DIFS period and prevents other devices from transmitting on the channel before the ACK is transmitted.

In PCF mode, an AP coordinates the resource management of the channel. The AP sequentially polls each of the devices in its cell by sending a polling message to each device. If the AP has data for the device, the data may be including in the polling message to the device. In response to the polling message, the polled device either sends an ACK to the AP or transmits data to the AP if the device has data for the AP. The response to the polling message is transmitted within one SIFS interval. If the AP does not receive an ACK or data from the polled device within one SIFS interval, the AP sends a polling message to the next device within one Priority Inter Frame Space (PIFS) interval, which is longer than a SIFS interval but shorter than a DIFS interval.

Although DCF and PCF may be used within the same cell, once the AP captures the channel in PCF mode, the AP will control the channel until the AP releases the channel because the SIFS and PIFS intervals are shorter than the DIFS interval.

The number of APs are minimized to provide sufficient coverage of a particular area. But, as the deployment of mobile devices increase, a bottleneck will develop from the system capacity and performance in the AP. More particularly, in current wireless LAN systems, the maximum data rate of 54 Mbps is shared among K mobile devices in the coverage area. The efficiency of media access using the CSMA/CA protocol drops significantly when K is large.

Therefore, there remains a need for devices and methods that increase the capacity and performance of the access infrastructure when deployed in public areas. Furthermore, such devices and methods should remain compatible with existing standards such as, for example, the IEEE 802 family of standards or the HiperLAN/2 standards.

SUMMARY OF THE INVENTION

One embodiment of the present invention is directed to a wireless communications access point comprising: at least two antennas; at least two device stacks, wherein in each stack comprises a data link layer and handles a data string; and a spatial processor configured to transmit orthogonal beams over the at least two antennas, wherein the orthogonal beams comprise a weighted sum of the data streams from the at least two device stacks. In some embodiments, each data link layer complies with an IEEE 802.11A standard. In some embodiments, a weight vector is applied to the data streams to form a weighted sum, the weight vector selected from eigenvectors of a beam-channel matrix having a largest corresponding eigenvalue. Some embodiments further comprise a channel estimator, the channel estimator forming a channel matrix, $\tilde{H}_k$, for each active mobile unit according to the equation.

$$\tilde{H}_k = (Y_p \tilde{X}_p^*)(\tilde{X}_p \tilde{X}_p^*)^{-1}$$

where $Y_p$ is a received signal matrix received by the at least two antennas and $\tilde{X}_p$ is a pilot signal matrix transmitted by a mobile unit. Some embodiments further comprise a scheduler configured to select up to N data streams, where N is a number of antennas of the access point, from K application packet queues, where K corresponds to a number of active mobile units. In some embodiments, the up to N data streams are selected by initializing a population of chromosomes, each chromosome comprising K binary digits, each binary digit representing an active mobile unit, and repeatedly performing the steps of determining a fitness of each chromosome, forming a intermediate population based on the fitness of the chromosome, and breeding a new population from the intermediate population. In some embodiments, breeding includes a crossover operation. In some embodiments, breeding includes a mutation operation.

Another embodiment of the present invention is directed to an access point communications architecture for wireless local area networks, the access point architecture comprising: at least two application packet buffers, where each application packet buffer contains a data stream; a scheduling layer configured to select two or more data streams, from the application packet buffers; two or more instances of a data link layer and an immediate access control layer, wherein the number of layers correspond to the number of selected data streams, and where each instance of a data link layer is configured to receive one of the selected data streams from the scheduling layer; and a physical layer configured to receive the data streams from the instances of the data link and media access layers and to transmit the data streams in orthogonal transmission beams, equal in number to the number of selected data streams. In some embodiments, each of the orthogonal transmission beams comprises a sum of a product of a weight vector and the selected data streams. In some embodiments, a weight vector is an eigenvector of a beam-channel matrix having the largest eigenvalue. In some embodiments, the instances of the data link layer complies with an IEEE 802.11A standard. In some embodiments, the selection of the data streams comprises: initializing a population of chromosomes, each chromosome comprising a number of binary digits, each binary digit representing an active mobile unit; determining a fitness of each chromosome; forming an intermediate population based on the fitness of each chromosome; breeding a new population from the intermediate population; repeating the steps of determining, forming, and breeding a predetermined number of times; and selecting a data stream based on a binary digit of the chromosome with the largest fitness. Some embodiments further comprise a channel estimation layer adapted to provide instantaneous channel matrix information for the selected data stream to the scheduling layer, the corresponding MAC layer, and physical layer. In some embodiments, the channel estimation layer periodically updates the instantaneous channel matrix for each data stream. Some embodiments further comprise a request collection layer adapted to manage uplink requests from a mobile unit.

Another embodiment of the present invention is directed to a method of selecting data streams in an access point employing more than one device stack comprising: initializing a population of chromosomes, each chromosome comprising a number of binary digits, each binary digit representing an active mobile unit; determining a fitness of each chromosome; forming an intermediate population based on the fitness of each chromosome; breeding a new population from the intermediate population; repeating the steps of determining, forming, and breeding a predetermined number of times; and selecting a data stream based on a binary digit of the chromosome with the largest fitness.

Another embodiment of the present invention is directed to a method of determining an orthogonal beam-forming matrix in a plurality access point employing more than one antenna communicating with a plurality of mobile units, comprising: determining an interference basis vector for each mobile units; forming orthogonal subspace matrixes for each unit from the interference basis vectors; determining an eigenvector and an eigenvalue of beam-channel matrixes derived from each orthogonal subspace matrix; and selecting the eigenvector corresponding to the largest eigenvalue for each element corresponding to a unit in the beam-forming matrix. In some embodiments, each element of the beam-forming matrix is based in part on an estimated channel matrix for each unit. In some embodiments, the interference basis vector is obtained using Gram-Schmidt orthogonalization on the interference space spanned by the estimated channel matrix for each unit.

Another embodiment of the present invention is directed to a media storing a computer program, which causes a processor that executes the program to perform steps which determine an orthogonal beam-forming matrix in a wireless access point employing more than one antenna communicating with a plurality of mobile units, the steps comprising: determining an interference basis vector for each mobile unit; forming orthogonal subspace matricies for each unit from the interference basis vector; determining an eigenvector and eigenvalue of beam-channel matricies derived from each orthogonal subspace matrix; and selecting the eigenvector corresponding to the larges eigenvalue for each element corresponding to a unit in the beam-forming matrix. In some embodiments, each element of the beam-forming matrix is based in part on an estimated channel matrix for each unit. In some embodiments, the interference basis vector is obtained using Gram-Schmidt orthogonalization on the interference space spanned by the estimated channel matrix for each unit.

BRIEF DESCRIPTION OF THE DRAWINGS

The invention will be described by reference to the preferred and alternative embodiments thereof in conjunction with the drawings in which.

DETAILED DESCRIPTION

Figure 1:
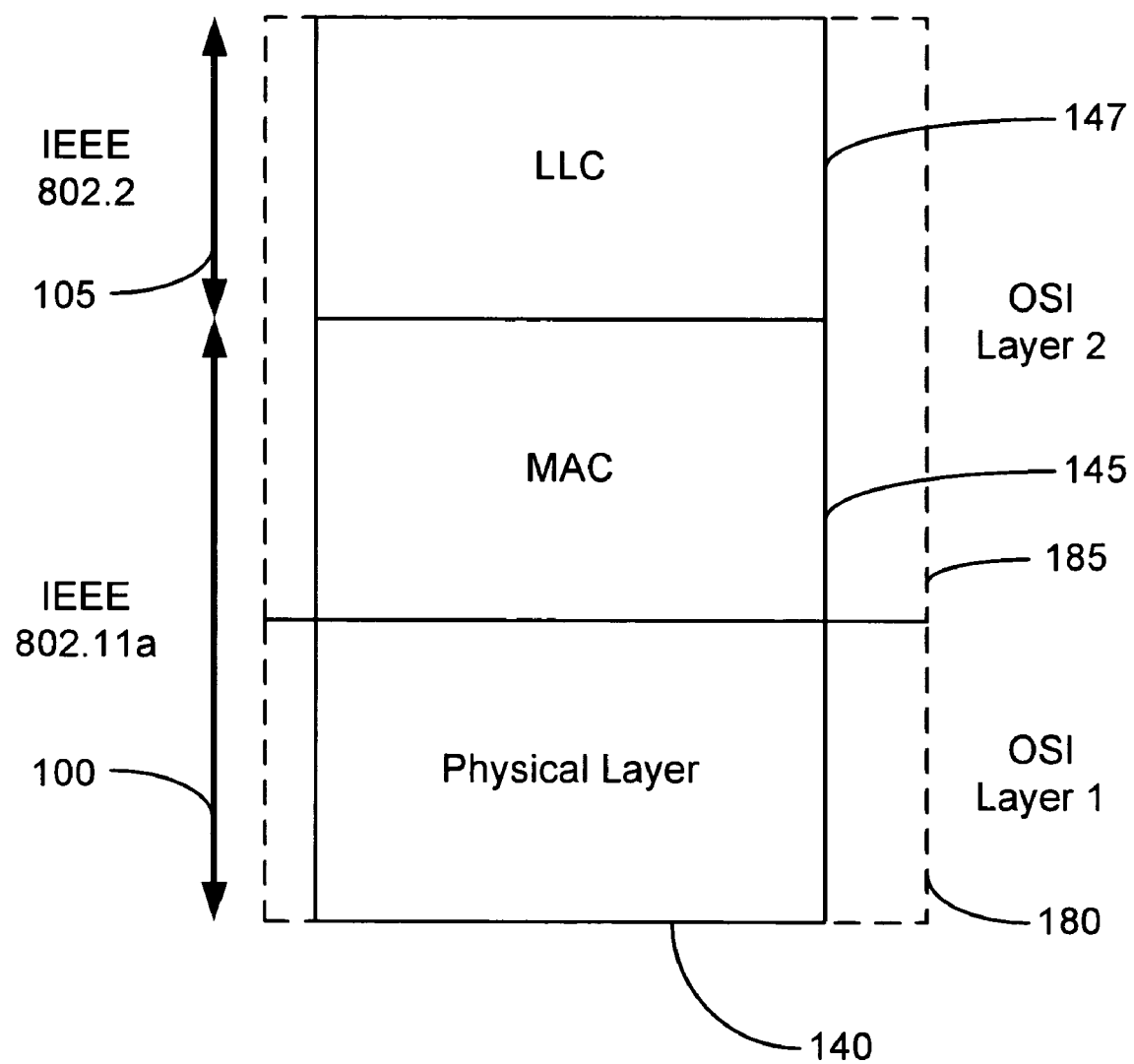
FIG. 1 is a diagram showing the relationship between IEEE standard communication layers and the OSI model.
Figure 2:
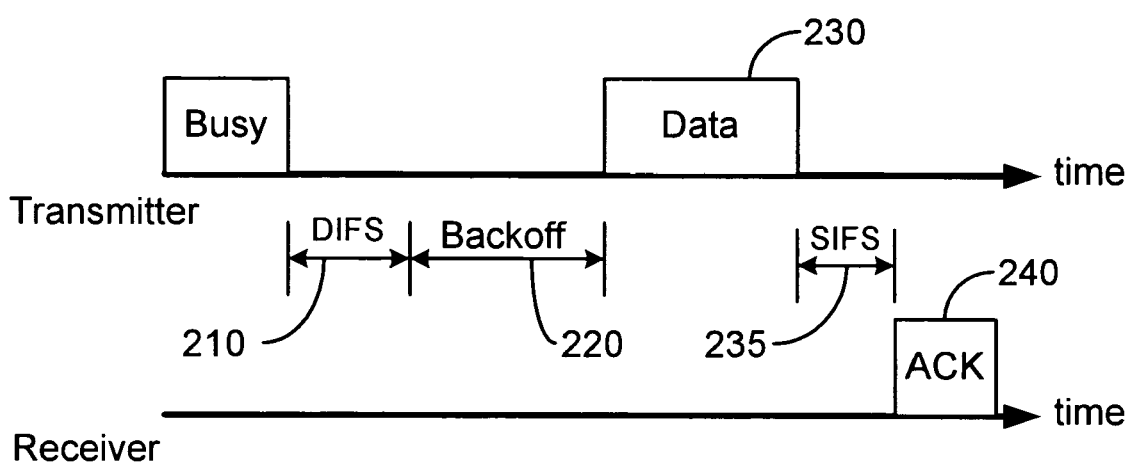
FIG. 2 is a timing diagram illustrating a communication exchange between two wireless devices using DCF.
Figure 3:
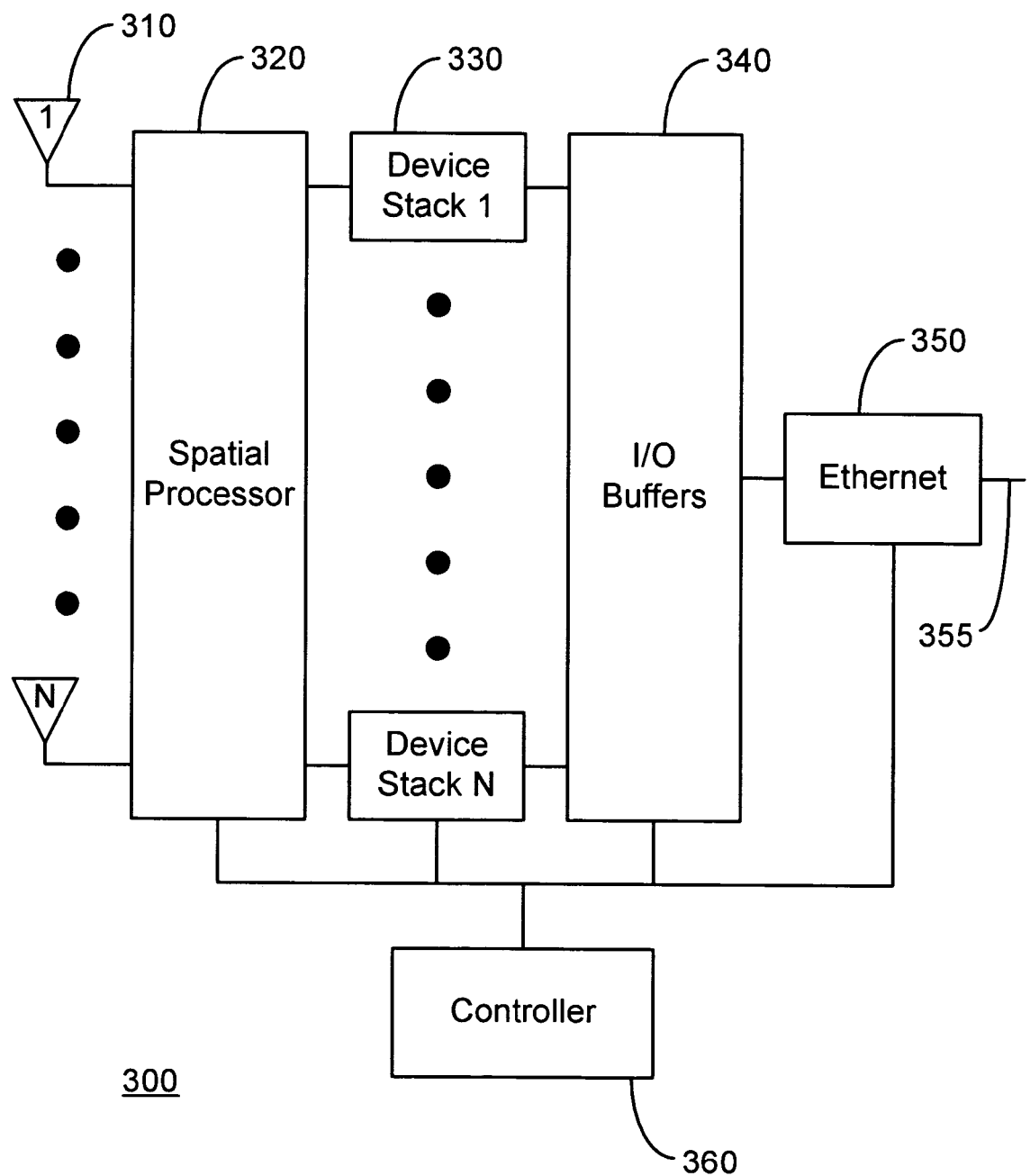
FIG. 3 is a block diagram illustrating a WLAN AP architecture of an embodiment of the present invention.

FIG. 3 is a block diagram illustrating a WLAN AP architecture of an embodiment of the present invention. The AP 300 shown in FIG. 3 includes at least two antennas 310. For the purposes of clarity, FIG. 3 shows only the first and $N^{th}$ antenna, where N is greater than one. Each antenna 310 is capable of receiving and transmitting data packets from and to devices within the cell of the AP 300. Each antenna 310 communicates with a spatial processor 320. Spatial processor 320 forms the N orthogonal beams transmitted by the N antennas to the mobile devices. The N orthogonal beams are formed by applying weights to each of the signals from the device stacks 330 and summing the weighed device stack signals to produce a beam that is orthogonal to the other N−1 beams. It should be understood that, depending on the demand, less than N antennas may be used to transmit the orthogonal beams. When receiving a signal, the spatial processor 320 separates the signals received by the N antennas before passing each separated signal to a device stack 330. Again, for purposes of clarity, FIG. 3 shows only the first and $N^{th}$ device stack.

Each device stack 330 is an implementation of a wireless protocol, such as for example, IEEE 802.11a. Each device stack 330 is an implementation of the OSI Layer 2 data link layer. Other OSI layers may be implemented in the device stack 330.

Each device stack 330 communicates with an input/output buffer array 340. The I/O buffer array 340 communicates with a network interface 350, such as for example, a gigabit Ethernet interface. The network interface 350 connects the AP to the rest of the network through communications link 355.

Controller 360 communicates with, and controls, the spatial processor 320, each of the device stacks 330, the I/O buffer array 340, and the network interface 350. The controller manages the configuration, operation, and maintenance of the AP 300. The controller 360 and each of the sub-systems may be implemented using digital processors, DSPs, or other devices known to one of skill in the art and are configured to execute programs that perform the described functions. The configuration of the digital processors and the associated components, such as for example, memory or I/O devices, and the production of the programs executed by the digital processors provide the means for implementing the functions and protocols described. In a preferred embodiment, spatial processor 320, device stacks 330, input/output buffers 340, and controller 360 are implemented in a special-purpose ASIC chipset.

Figure 4:
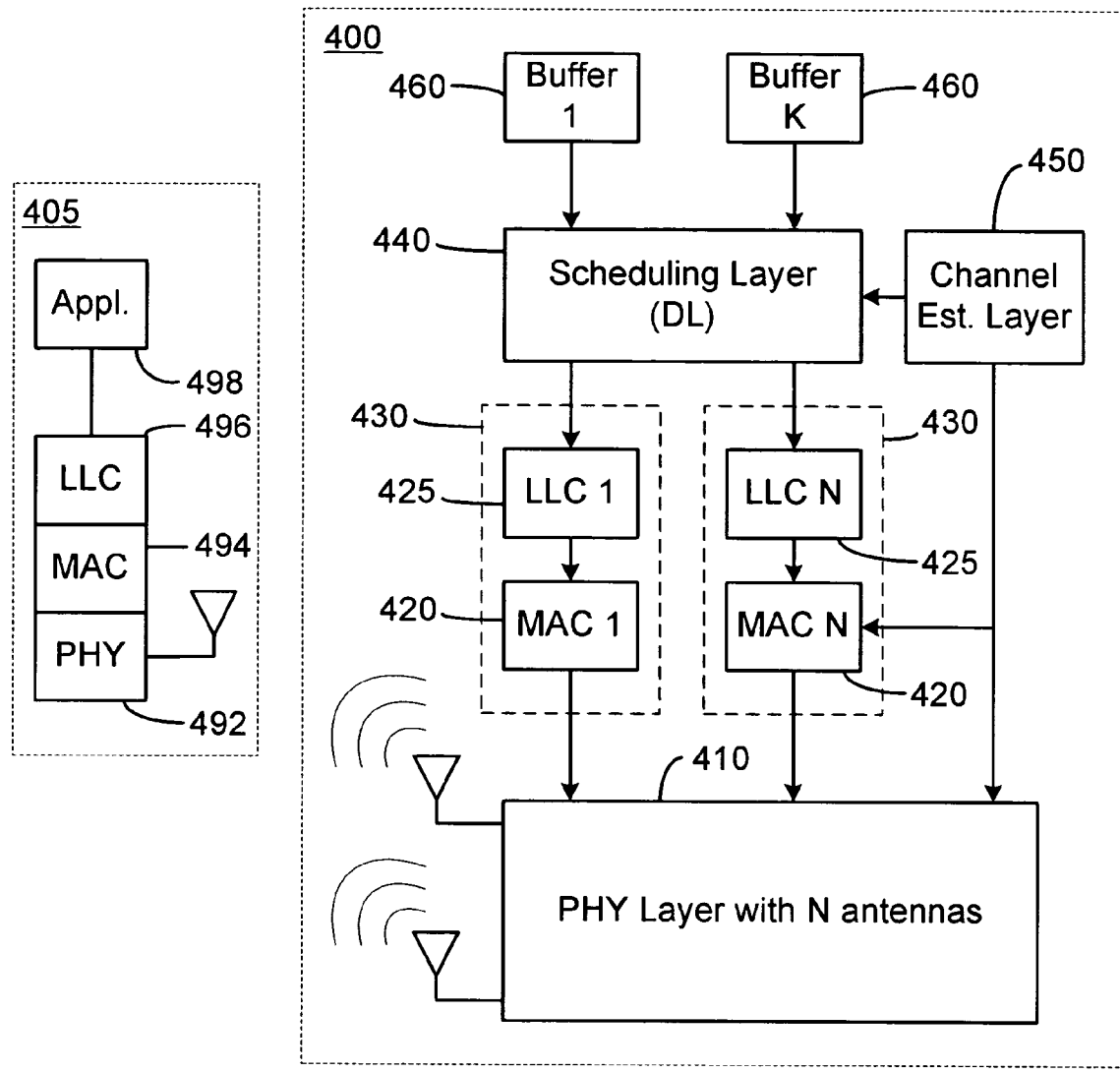
FIG. 4 is a diagram illustrating the protocol architecture during transmission from the AP to the mobile device.

FIG. 4 is a diagram illustrating the downlink protocol architecture during transmission from the AP to the mobile device. The AP 400 includes a physical (PHY) layer 410 with N antennas. On top of the PHY layer 410 are multiple instantiations of a MAC layer 420 and LLC layer 425, collectively referred to as the device stack 430. FIG. 4, for purposes of clarity, shows only two instantiations of the device stack 430 but it should be understood that there are N instantiations of the device stack 430, where N is greater than one. In a preferred embodiment, the PHY layer 410 implements the IEEE 802.11a protocols and the MAC layer 420 and the LLC layer 425 implement the IEEE 802.11 protocols and communicate with at least one mobile device 490 having IEEE 802.11 instantiations of the MAC layer 494 and LLC layer 496 and IEEE 802.11a instantiation of the PHY layer 492.

A downlink scheduler 440 provides an interface between each of the LLC layers 425 and K application packet queues 460 where K is the number of active mobile units in the AP's cell and is independent of N. FIG. 4, for purposes of clarity, shows only the first and $K^{th}$ application packet queue 460, but it should be understood that the AP is configured to provide K buffers. Each application packet queue, or buffer 460, contains the data for transmission to a mobile unit.

Channel estimation layer 450 estimates and maintains the instantaneous channel matrices of each active user and provides the information to the downlink scheduler 440, each MAC layer 420, and the PHY layer 410.

The N antennas of the AP allow for N degrees of freedom, enabling the AP to communicate with up to N mobile units 405 simultaneously while requiring no modifications to the protocol stacks of the mobile units 405.

Figure 5:
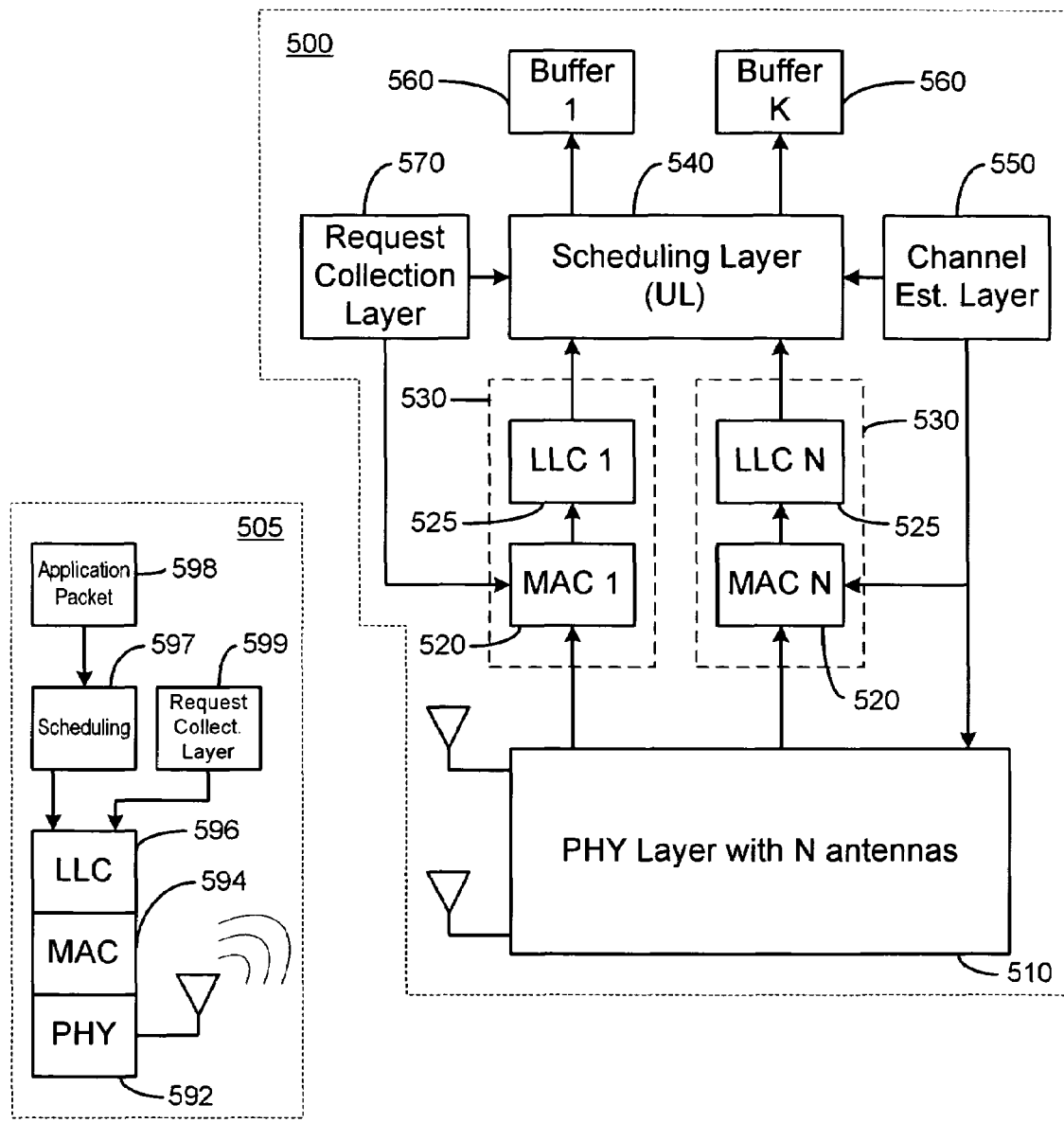
FIG. 5 is a diagram illustrating the protocol architecture during uplink transmission from the mobile device to the AP.

FIG. 5 is a diagram illustrating the protocol architecture during uplink transmission from a mobile device 505 to AP 500. When mobile unit 505 is ready to transmit data to AP 500, mobile unit 505 sends an application packet 598 containing the data to a mobile unit scheduling layer 597. The mobile unit scheduling layer 597 listens to the scheduling results from the AP 500 and delivers the application packet 598 to the LLC 596 for transmission to the AP 500 via the MAC 594 and PHY 592 layers of the mobile unit 505 when selected by the AP 500 to transmit the packet. The mobile unit request collection layer 599 in the mobile unit 505 reports to the AP 500 when queried by the AP 500 whether the mobile unit 505 has an application packet ready for transmission to the AP 500.

The AP 500 receives the mobile unit 505 transmission at the AP's PHY layer 510 and passes the received packet through the MAC layer 520, LLC layer 530, and scheduling layer 540 to an application buffer 560. The request collection layer 570 in the AP 500 manages the uplink request status of the K active mobile units and provides the uplink requests to the scheduling layer 540 and the MAC layer 520. The channel estimation layer 550 estimates and maintains the instantaneous channel matrices of each active user and provides the information to the uplink scheduling layer 540, each MAC layer 520, and the PHY layer 510.

The AP 500 may be configured during uplink to have one MAC instance operate in PCF mode where instructions to the N mobile units scheduled for uplink transmission are broadcast to the mobile units such that the N mobile units scheduled for uplink transmission transmit their application packets to the AP 500 simultaneously. It should be understood that simultaneous transmission means that each scheduled mobile unit begins transmission within one SIFS interval of the other scheduled mobile units and does not require the scheduled mobile units to begin transmission exactly at the same time.

Alternatively, AP 500 may be configured during uplink to have N instantiations of the device stack 530 where each MAC layer 520 operates in DCF mode.

Figure 6:
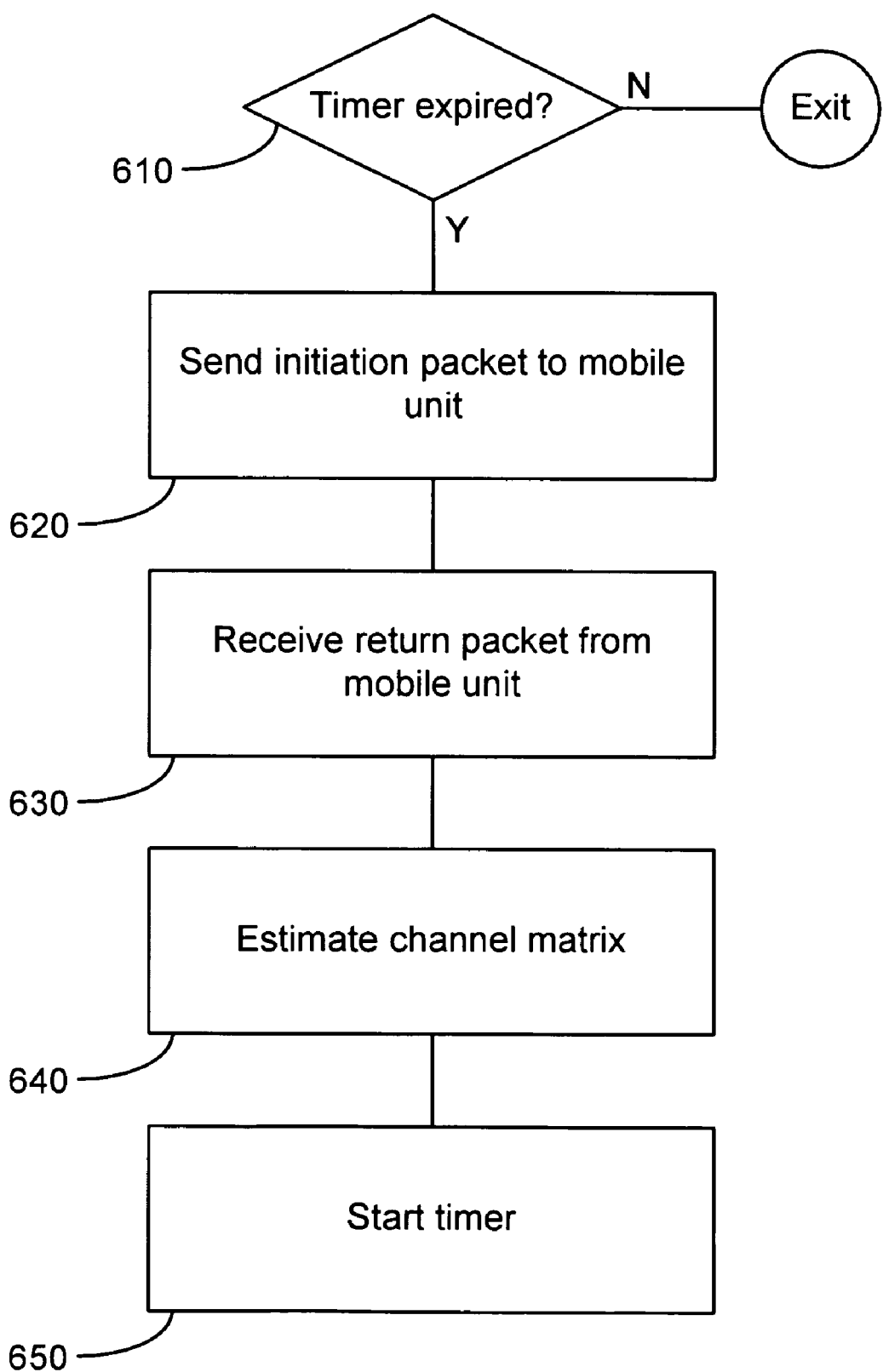
FIG. 6 is a flow diagram illustrating channel estimation performed in the channel estimation layer of the AP.

FIG. 6 is a flow diagram illustrating channel estimation for an active mobile unit performed in the channel estimation layer of the AP. Although, FIG. 6 illustrates the procedure of estimating the communication channel between the AP and one active mobile unit, it should be understood, that the procedure is repeatedly performed for each active mobile unit in the AP's cell.

In 610, the channel estimator verifies that the channel information for the mobile unit is current by checking a timer. If the timer is not expired, the channel information for the mobile unit is assumed valid and the channel estimator will exit the procedure for that mobile unit. If the time is expired, a new estimation of the communication channel between the mobile unit and the AP is initiated by configuring the MAC layer of the AP to send an initiation packet 620 to the mobile unit. The initiation packet 620 may include predefined symbols that cause the mobile unit to transmit a return packet to the AP.

In 630, the AP receives the return packet from the mobile unit. The return packet may be a sequence of P defined symbols wherein the signal received by the AP over the N antennas may be represented by the equation:

$$Y_p = H_k X_p + Z_p \quad (1)$$

where $Y_p = [y_1 \ldots y_p]$ is the N×P dimension received signal matrix, N is the number of antennas at the AP receiving the signal, P is the number of symbols or frames transmitted in the return packet, p is an index that runs from 1 to P, $H_k$ is the N×1 dimension channel matrix for the $k^{th}$ active mobile unit, k is an index that runs from 1 to K where K is the number of active mobile units in the AP cell, $X_p$ is a 1×P dimension pilot signal matrix transmitted by the $k^{th}$ mobile unit, and $Z_p$ is the N×P dimension channel noise matrix.

In 640, the channel matrix for the $k^{th}$ mobile unit is estimated by the equation:

$$\tilde{H}_k = (Y_p \tilde{X}_p^*)(\tilde{X}_p \tilde{X}_p^*)^{-1} \quad (2)$$

where $\tilde{H}_k$ is the estimated channel matrix for the $k^{th}$ mobile unit. The matrix operations indicated in equation (2) may be implemented using methods known to one of skill in the art. The estimated channel matrix for the selected user is passed to the channel estimation layer and may be used for contention request resolution and payload separation between multiple mobile units.

A timer is started in 650. The timer determines the duration before the channel for the $k^{th}$ mobile user is estimated.

Figure 7:
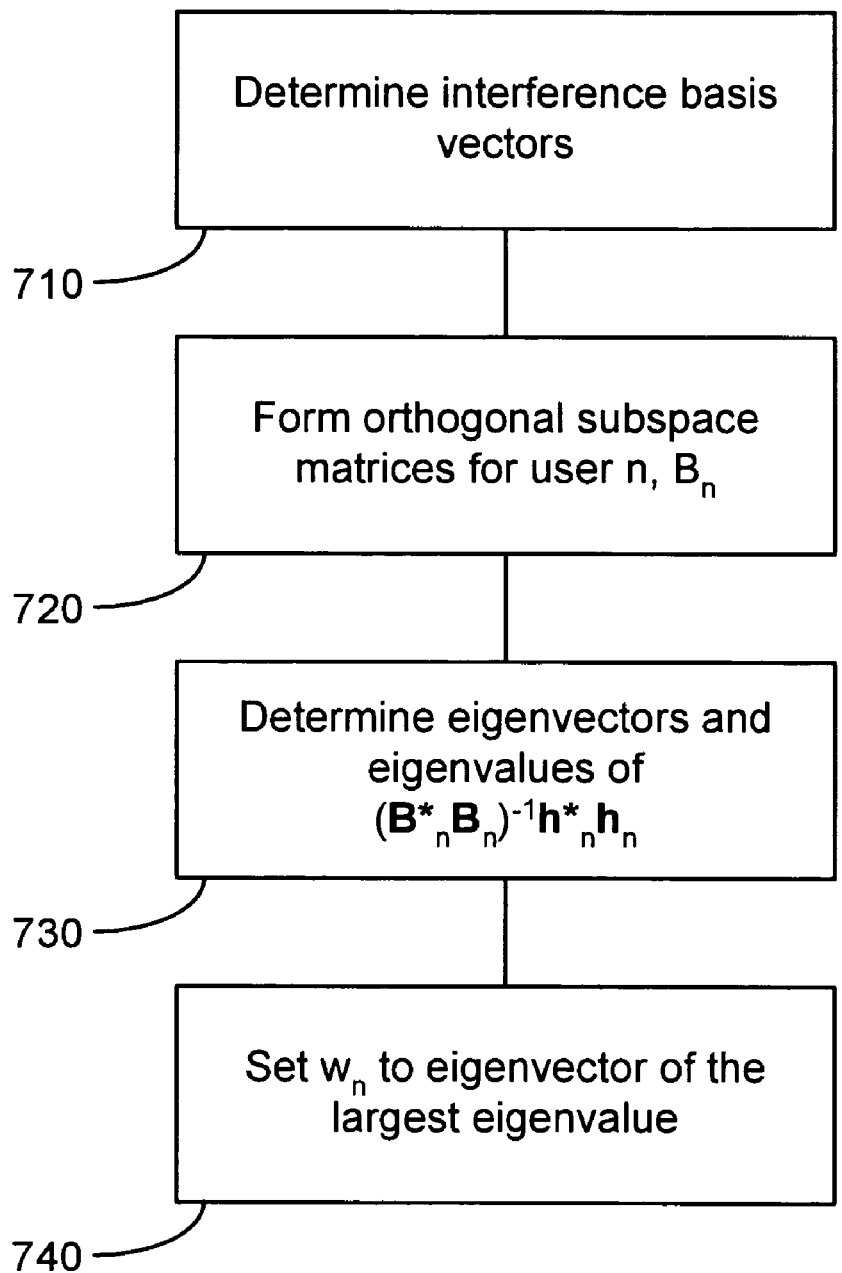
FIG. 7 is a flow diagram illustrating a method for orthogonal beam-forming in an embodiment of the present invention.

FIG. 7 is a flow diagram illustrating a method for orthogonal beam-forming for the $n^{th}$ mobile unit in one embodiment of the present invention. The method shown in FIG. 7 is performed for each of the N mobile units that are selected for transmission. For purposes of illustration, the following description assumes N antennas and N device stacks where N is greater than one. Beam forming is performed in the spatial processor of the AP by applying a set of weights, $W = [w_1, w_2, \ldots, w_N]$, where $w_n$ is the beam forming vector for the $n^{th}$ antenna, to the signals from each of the device stacks. Each element of the beam-forming matrix, W, is based in part on the estimated channel matrices for the N selected mobile units and may be calculated by the controller or spatial processor.

In step 710, the interference basis vectors are determined for each selected mobile unit. The basis vectors for the $n^{th}$ mobile unit are obtained by using, for example, Gram-Schmidt orthogonalization on the interference space spanned by $(h_1, \ldots, h_{n-1}, h_{n+1}, \ldots, h_N)$, where $h_n$ is the estimated channel matrix for the $n^{th}$ mobile unit.

In step 720, the orthogonal subspace matrices, $B_n$, for the $n^{th}$ mobile unit are formed. The subspace matrices are given by the following equation:

$$B_n = h_n^* - \sum_{j \neq n} (e_j^* h_n^*) e_j \quad (3)$$

In step 730, the eigenvectors and eigenvalues of the beam-channel matrix, $(B_n^* B_n)^{-1} h_n^* h_n$, are determined by any of the methods known to one of skill in the art. The eigenvector having the largest eigenvalue is selected as $w_n$ in step 740.

Figure 8:
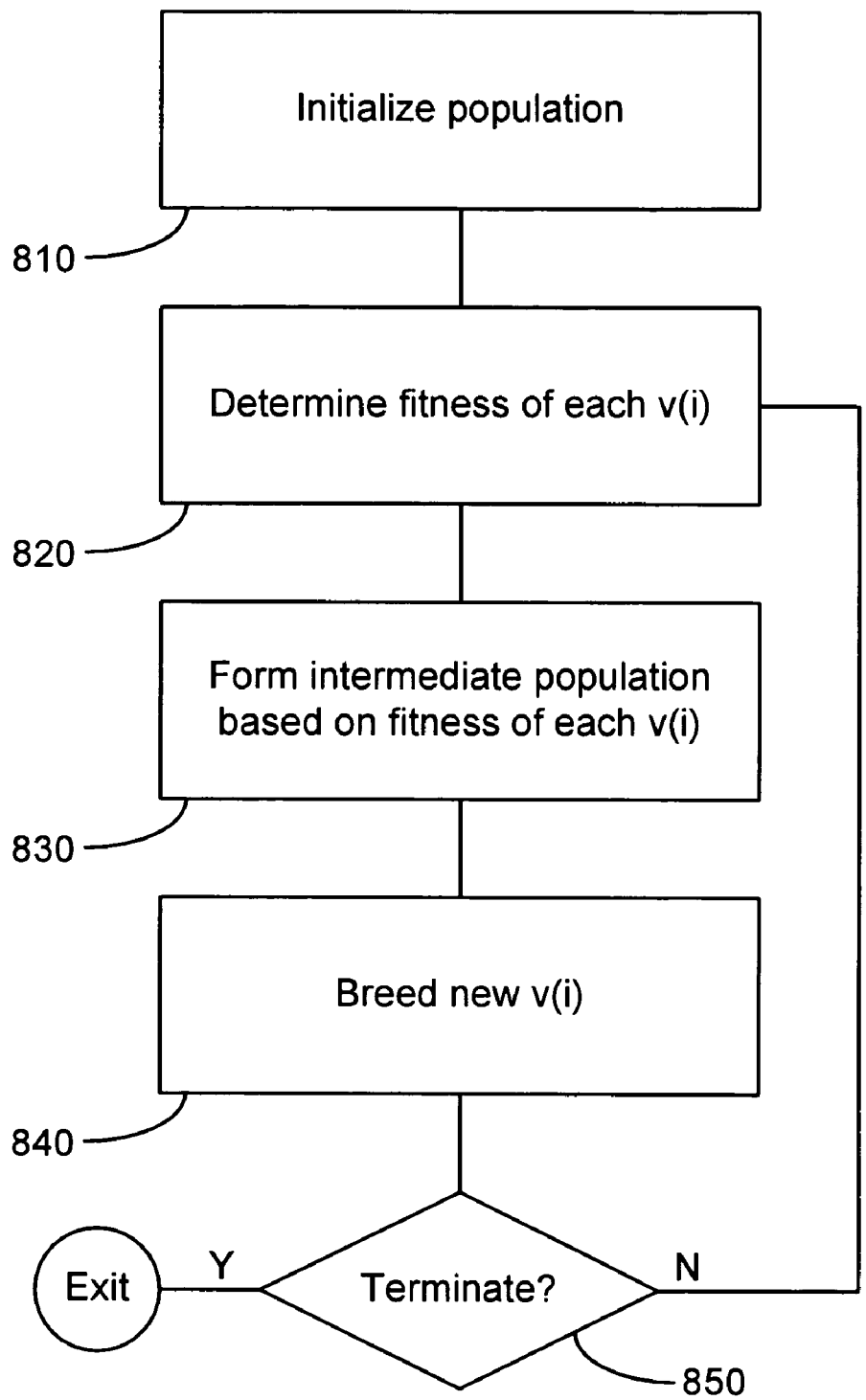
FIG. 8 is a flowchart illustrating a method of scheduling in one embodiment of the present invention.

FIG. 8 is a flowchart illustrating a method of scheduling in one embodiment of the present invention. An AP with N antennas may simultaneously transmit to N mobile units. If the number of active mobile units, K, is greater than N, the AP must select the N mobile units that will receive the next payload transmission. The scheduling of transmissions is done in the scheduling layer of the AP and may be implemented by the controller.

Scheduling may be accomplished by optimizing a system objective function:

$$U(\overline{R}_1, \ldots, \overline{R}_K) = E\left[\sum_{k=1}^{K} \alpha_k \beta_k r_k\right] \quad (4)$$

where $\overline{R}_k$ is the average throughput of the $k^{th}$ mobile unit, $r_k$ is the instantaneous throughput of the $k^{th}$ mobile unit, $\alpha_k$ is a weighting constant, and $\beta_k$ is 1 if the $k^{th}$ mobile device is selected and 0 if the $k^{th}$ mobile device is not selected.

If $\alpha_k$ is set to one for all k in the objective function, the scheduler is called a maximum throughput scheduler. If $\alpha_k$ is set to $1/\overline{R}_k$ for each active mobile unit, the scheduler is called a proportional fair scheduler.

Referring to FIG. 8, the scheduler is initialized in step 810 by forming M candidate chromosomes, v(i)=(β₁, . . . , β_K), consisting of K binary digits under the constraint $$\sum_{j=1}^{N} \beta_j \leq N \quad (5)$$

In step 820, the fitness of each candidate chromosome is determined by a utility function, G, defined as:

$$G(v(i)) = G(\beta_1, \ldots, \beta_K) = E\left[\sum_{k=1}^{K} \alpha_k \beta_k r_k\right] \quad (6)$$

where the user data rate, $r_k$, is given by:

$$r_k = \log_2(1 + p_k |h_k w_k|^2) \quad (7)$$

where $p_k$ is given by:

$$p_k = \left(\frac{\alpha_k}{\lambda} - \frac{1}{|h_k w_k|^2}\right)^{\dagger} \quad (8)$$

where λ is a Lagrange multiplier to enforce a constraint on total transmitted power, $P_T$, such that:

$$\sum_{k=1}^{K} \beta_k p_k = P_T \quad (9)$$

Based on the fitness of each chromosome, an intermediate population of chromosomes is formed in step 830. The fitness of the i$^{th}$ chromosome, G(v(i)), is divided by the average fitness of the population, $\overline{G}$, where $\overline{G}$ is given by the equation:

$$\overline{G} = \frac{1}{M}\sum_{i=1}^{M} G(v(i)) \quad (10)$$

The integer portion of G(v(i))/$\overline{G}$ is the number of copies of v(i) placed in an intermediate population. The fractional portion of G(v(i))/$\overline{G}$ represents the probability of an additional copy of v(i) being placed in the intermediate population. For example, if G(v(i))/$\overline{G}$ is 1.36, one copy of v(i) is placed in the intermediate population and a second copy of v(i) is placed in the intermediate population with a probability of 36%. The process is repeated for each chromosome until the intermediate population has M chromosomes. In general, the intermediate population will have a higher average fitness because chromosomes having higher fitness have a greater chance of continuing in the next population.

In step 840, breeding of the new population is performed by two operations: crossover and mutation. Both operations introduce randomness to the population such that the new population may include the fitter chromosomes from the current population along with new random elements. The processes may act independently of each other.

Figure 9:
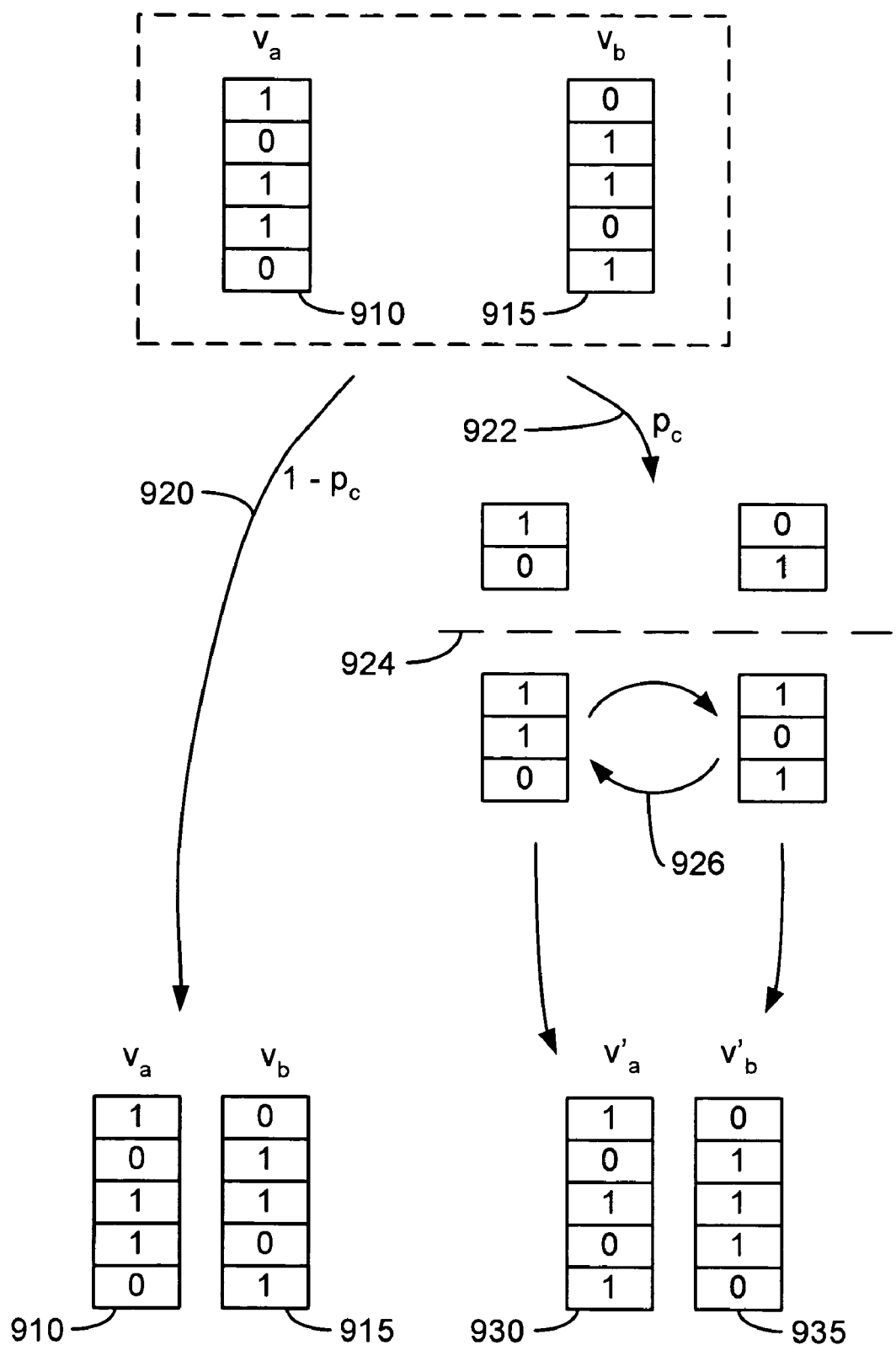
FIG. 9 is a diagram illustrating the crossover process.

The crossover process begins with the random selection of two chromosomes from the intermediate population using any of the random selection methods known in the computer simulation art. FIG. 9 is a diagram illustrating the crossover process. For purposes of illustration, FIG. 9 assumes K=5, N=3 and the crossover point, $i_x$=3. In FIG. 9, the two selected chromosomes are designated as $v_a$ 910 and $v_b$ 915. Crossover for the selected pair of chromosomes occurs at a crossover probability, $p_c$. If the selected pair is not chosen for crossover 920, the chromosomes are not modified by the process and are placed in the new population.

If the selected pair is chosen for crossover 922, a crossover point, $i_x$, is randomly selected 924 between 1 and K, which in the example of FIG. 9 is $i_x$=3. The portion of $v_a$ from $i_x$ to K is exchanged 926 with the corresponding portion of $v_b$ to create two modified chromosomes 930 and 935. The modified chromosomes 930 and 935 are placed in the new population.

The mutation process may be applied to every bit in the intermediate population. Each bit, $\beta_i$, in each chromosome in the population is allowed to toggle between the 0-state representing an unselected mobile device and the 1-state representing a selected mobile device with a probability $p_m$. The selection of the values for $p_c$ and $p_m$ may be determined by one of skill in the computer simulation art without undue experimentation to balance, for example, the duration of the simulation with the sample space.

In a preferred embodiment, chromosomes modified by the crossover or mutation process may be further modified to satisfy the constraint of equation 5. If the modified chromosome violates the condition of equation 5, a randomly selected bit of the modified chromosome is set to 0. This process is repeated until the modified chromosome satisfies the condition of equation 5.

In step 850, the scheduler determines whether the process should be terminated. If the process should be terminated, the scheduler selects the chromosome having the highest utility function value from the new population and passes the chromosome to the scheduling layer before exiting the procedure. The termination criteria may be any of the termination criteria known in the simulation art. In a preferred embodiment, the termination criterion is based on the number of iterations of steps 820 to 840. If the termination criterion is not satisfied, the current population is replaced by the new population and control is transferred to step 820.

In some alternative embodiments, breeding may include an additional process that preserves the fittest chromosome in the current population by placing a copy of the fittest chromosome in the new population. The fittest chromosome is the chromosome having the largest value of the utility function, G(v(i)).

Figure 10:
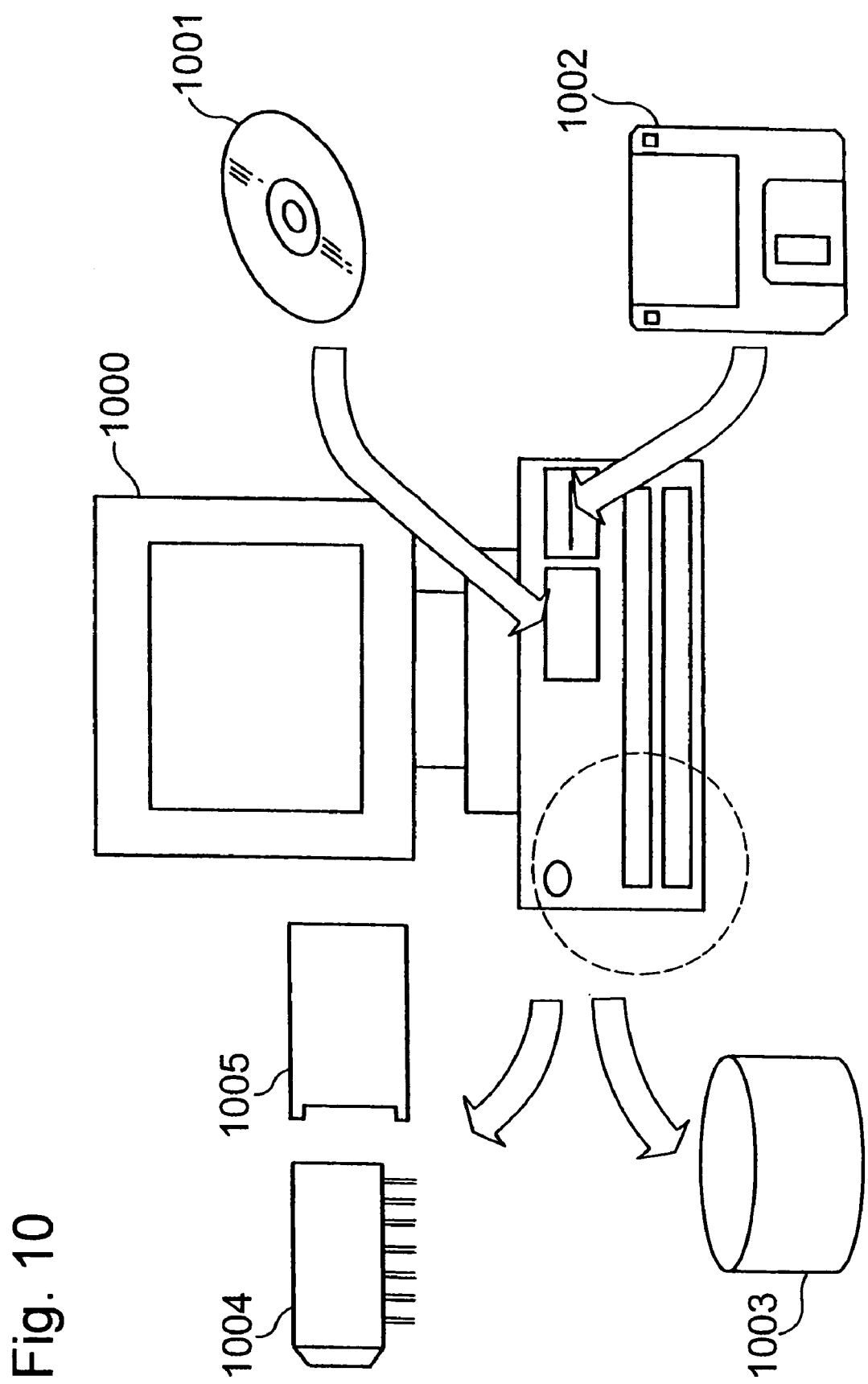

In the specification, the term "media" means any medium which can record data therein. Examples of a recording medium are illustrated in FIG. 10.

The term "media" includes, for instance, a disk shaped media for 1001 such as CD-ROM (compact disc-read only memory), magneto optical disc or MO, digital video disc-read only memory or DVD-ROM, digital video disc-random access memory or DVD-RAM, a floppy disc 1002, a memory chip 1004 such as random access memory or RAM, read only memory or ROM, erasable programmable read only memory or E-PROM, electrical erasable programmable read only memory or EE-PROM, a rewriteable card-type read only memory 1005 such as a smart card, a magnetic tape, a hard disc 1003, and any other suitable means for storing a program therein.

A recording media storing a program for accomplishing the above mentioned apparatus maybe accomplished by programming functions of the above mentioned apparatuses with a programming language readable by a computer 100 or processor, and recording the program on a media such as mentioned above.

A server equipped with a hard disk drive may be employed as a recording media. It is also possible to accomplish the present invention by storing the above mentioned computer program on such a hard disk in a server and reading the computer program by other computers through a network.

As a computer processing device 1000, any suitable device for performing computations in accordance with a computer program may be used. Examples of such devices include a personal computer, a laptop computer, a microprocessor, a programmable logic device, or an application specific integrated circuit.

Having thus described at least illustrative embodiments of the invention, various modifications and improvements will readily occur to those skilled in the art and are intended to be within the scope of the invention. Accordingly, the foregoing description is by way of example only and is not intended as limiting. The invention is limited only as defined in the following claims and the equivalents thereto.

What is claimed is:

1. An access point communications architecture for wireless local area networks, the access point architecture comprising:
    at least two application packet buffers, where each application packet buffer contains a data stream;
    a scheduling layer configured to select two or more data streams, from the application packet buffers;
    two or more instances of a data link layer and a media access control layer, wherein the number of layers corresponds to the number of selected data streams, and where each instance of a data link layer is configured to receive one of the selected data streams from the scheduling layer; and
    a physical layer configured to receive the data streams from the instances of the data link and media access layers and to transmit the data streams in orthogonal transmission beams, equal in number to the number of selected data streams.

2. The access point architecture of claim 1 wherein each of the orthogonal transmission beams comprises a sum of a product of a weight vector and the selected data streams.

3. The access point architecture of claim 2 wherein a weight vector is an eigenvector of a beam-channel matrix having the largest eigenvalue.

4. The access point architecture of claim 1 wherein the instances of the data link layer complies with an IEEE 802.11a standard.

5. The access point architecture of claim 1 wherein the selection of the data streams comprises:
    initializing a population of chromosomes, each chromosome comprising a number of binary digits, each binary digit representing an active mobile unit;
    determining a fitness of each chromosome;
    forming an intermediate population based on the fitness of each chromosome;
    breeding a new population from the intermediate population;
    repeating the steps of determining, forming, and breeding a predetermined number of times; and
    selecting a data stream based on a binary digit of the chromosome with the largest fitness.

6. The access point architecture of claim 1, further comprising a channel estimation layer adapted to provide instantaneous channel matrix information for the selected data stream to the scheduling layer, the corresponding MAC layer, and physical layer.

7. The access point architecture of claim 6, wherein the channel estimation layer periodically updates the instantaneous channel matrix for each data stream.

8. The access point architecture of claim 1, further comprising a request collection layer adapted to manage uplink requests from a mobile unit.

* * * * *